US012585821B2

(12) United States Patent
Saifee et al.

(10) Patent No.: US 12,585,821 B2
(45) Date of Patent: Mar. 24, 2026

(54) VOICE PRIVACY FOR FAR-FIELD VOICE CONTROL DEVICES THAT USE REMOTE VOICE SERVICES

(71) Applicant: Avago Technologies International Sales Pte. Limited, Singapore (SG)

(72) Inventors: Qutubuddin Saifee, Bangalore (IN); Raghuram Annadana, Bangalore (IN); Sunil Kashinath Shripad, Bangalore (IN); Manoj Singhal, Bangalore (IN); Stephen Ray Palm, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 412 days.

(21) Appl. No.: 18/102,636

(22) Filed: Jan. 27, 2023

(65) Prior Publication Data

US 2024/0256706 A1 Aug. 1, 2024

(51) Int. Cl.
*G06F 21/62* (2013.01)
*G10L 15/22* (2006.01)
(Continued)

(52) U.S. Cl.
CPC .......... *G06F 21/6254* (2013.01); *G10L 15/22* (2013.01); *G10L 15/30* (2013.01);
(Continued)

(58) Field of Classification Search
CPC . G06F 21/6245; G06F 21/6254; G10L 15/22; G10L 15/30; G10L 21/007;
(Continued)

(56) References Cited

U.S. PATENT DOCUMENTS 8,554,559 B1 * 10/2013 Aleksic ................... G10L 21/00
704/235
8,880,398 B1 * 11/2014 Aleksic ................... G10L 15/07
704/235
(Continued)

FOREIGN PATENT DOCUMENTS

CN 110176238 A 8/2019
CN 110992951 A 4/2020
(Continued)

OTHER PUBLICATIONS

Aloufi, et al., "A Tandem Framework Balancing Privacy and Security for Voice User Interfaces," Jul. 2021, retrieved from https://arxiv.org/pdf/2107.10045.pdf, 14 pages.
(Continued)

*Primary Examiner* — Hosuk Song
(74) *Attorney, Agent, or Firm* — King Intellectual Asset Management

(57) ABSTRACT

A system includes a first module and a second module. The first module may be configured to perform operations including generating voice data based on an input audio, anonymizing the voice data by applying a first audio transformation, and transmitting the anonymized voice data to a first remote ASR module for generating speech recognition data. The second module may be configured to perform operations including separating the input audio into a first data and a second data, anonymizing the first data by applying a second audio transformation to the first data, generating an anonymized audio data by combining the anonymized first data and the second data, and transmitting the anonymized audio data to a second remote ASR module for generating speech recognition data.

24 Claims, 10 Drawing Sheets

(51) Int. Cl.
| | |
|---|---|
| *G10L 15/30* | (2013.01) |
| *G10L 21/007* | (2013.01) |
| *G10L 21/0216* | (2013.01) |
| *G10L 21/028* | (2013.01) |
| *G10L 21/034* | (2013.01) |
| *G10L 21/0208* | (2013.01) |

(52) U.S. Cl.
CPC ........ *G10L 21/007* (2013.01); *G10L 21/0216* (2013.01); *G10L 21/028* (2013.01); *G10L 21/034* (2013.01); *G10L 2021/02082* (2013.01)

(58) Field of Classification Search
CPC . G10L 21/0216; G10L 21/028; G10L 21/034; G10L 2021/02082
See application file for complete search history.

(56) References Cited

U.S. PATENT DOCUMENTS

| | | | |
|---|---|---|---|
| 9,437,207 | B2 | 9/2016 | Jacob et al. |
| 11,069,349 | B2 | 7/2021 | Dillard et al. |
| 11,100,940 | B2 * | 8/2021 | Pearson .............. G10L 21/0364 |
| 11,170,761 | B2 * | 11/2021 | Thomson ................ G10L 15/06 |
| 11,308,962 | B2 | 4/2022 | Smith et al. |
| 11,594,221 | B2 * | 2/2023 | Thomson .............. G10L 15/187 |
| 11,651,107 | B2 * | 5/2023 | Pasupuleti ................ G06N 3/04 |
| | | | 704/200 |
| 11,735,156 | B1 * | 8/2023 | Trueba .................. G10L 13/033 |
| | | | 704/200 |
| 11,935,540 | B2 * | 3/2024 | Thomson .......... H04M 3/42382 |
| 12,100,383 | B1 * | 9/2024 | Ezzerg ................... G06N 3/045 |
| 2019/0259375 | A1 | 8/2019 | Kim et al. |
| 2019/0385591 | A1 | 12/2019 | Shin et al. |
| 2020/0005792 | A1 | 1/2020 | Wutscher |
| 2021/0294918 | A1 | 9/2021 | Pasupuleti et al. |

FOREIGN PATENT DOCUMENTS

| | | | |
|---|---|---|---|
| EP | 3905631 | A1 | 11/2021 |
| EP | 4016355 | A2 | 6/2022 |
| FR | 3061394 | A1 | 6/2018 |

OTHER PUBLICATIONS

Aloufi, et al., "Emotionless: Privacy-Preserving Speech Analysis for Voice Assistants," Aug. 2019, retrieved from https://arxiv.org/pdf/1908.03632.pdf, 5 pages.

Anonymous, "What is the Alexa Voice Service?," retrieved from https://developer.amazon.com/en-US/docs/alexa/alexa-voice-service/get-started-with-alexa-voice-service.html, visited Oct. 17, 2022.

Ganar, et al., "Enabling Use of Dynamic Anonymization for Enhanced Security in Cloud," IOSR Journal of Computer Engineering, Jul.-Aug. 2013, vol. 12, No. 3, pp. 44-51.

Hellman, et al., "Research in methods for achieving secure voice anonymization," KTH Royal Institute of Technology, 2022, retrieved from http://kth.diva-portal.org/smash/get/diva2:1678546/FULLTEXT01.pdf, 61 pages.

Kai, et al., "Lightweight Voice Anonymization Based on Data-Driven Optimization of Cascaded Voice Modification Modules," IEEE Spoken Language Technology Workshop, 2021, abstract.

Prajapati, et al., "Voice privacy using CycleGAN and time-scale modification," Computer Speech & Language, vol. 74, Jul. 2022, abstract.

Qian, et al., "VoiceMask: Anonymize and Sanitize Voice Input on Mobile Devices," Nov. 2017, retrieved from https://arxiv.org/pdf/1711.11460.pdf, 10 pages.

Siegert et al., "Personal data protection and academia: GDPR issues and multi-modal data-collections 'in the wild'," Online Journal of Applied Knowledge Management, vol. 8, No. 1, 2020, 16 pages.

Subramanian, "Key Concepts in Privacy Technologies," Aug. 2021, retrieved from https://blogs.sap.com/2021/08/22/key-concepts-in-privacy-technologies/.

Wang, et al., "VoiceFilter: Targeted Voice Separation by Speaker-Conditioned Spectrogram Masking," 2019, retrieved from https://google.github.io/speaker-id/publications/VoiceFilter/.

Winkler, et al., "Dummy-Based Anonymization for Voice-Controlled IoT Devices," UBICOMM 2018, Jan. 2018, 8 pages.

Yamac, et al., "Multi-Level Reversible Data Anonymization via Compressive Sensing and Data Hiding," IEEE Transactions on Information Forensics and Security, 2021, vol. 16, pp. 1014-1028.

Extended European Search Report, EP App. No. 24153075.7, May 28, 2024.

Qian et al., "Speech Sanitizer: Speech Content Desensitization and Voice Anonymization," in IEEE Transactions on Dependable and Secure Computing, vol. 18, No. 6, pp. 2631-2642, Dec. 17, 2019.

Yoo et al., "Speaker Anonymization for Personal Information Protection Using Voice Conversion Techniques," in IEEE Access, vol. 8, pp. 198637-198645, Nov. 3, 2020.

EP Application No. 24153075.7, Office Action dated Oct. 30, 2025, 6 pages.

O'Malley Tom et al: "A Conformer-Based ASR Frontend for Joint Acoustic Echo Cancellation, Speech Enhancement and Speech Separation", 2021 IEEE Automatic Speech Recognition and Understanding Workshop (ASRU), IEEE, Dec. 13, 2021, pp. 304-311, DOI:10.1109/ASRU51503.2021.9687942 [retrieved on Jan. 9, 2022], 6 pages.

* cited by examiner

VOICE PRIVACY FOR FAR-FIELD VOICE CONTROL DEVICES THAT USE REMOTE VOICE SERVICES

TECHNICAL FIELD

Exemplary implementations of this disclosure may generally relate to systems, integrated circuits, and methods for far-field voice processing and, more particularly, to voice privacy for far-field voice control devices that use remote voice services.

BACKGROUND

Voice control devices (e.g., smart speakers and voice assistants) often have limited processing power and provide voice data to remote (e.g., cloud) computers for processing, such as speech recognition to interpret user commands. To do so, the voice control devices can include various software development kits (SDKs) for transporting voice data to remote computers. However, using SDKs and offloading voice data to external devices may allow remote computers to perform other processing unknown to the user to gather further information about the user, such as data mining for personally identifiable information.

Voice data can be used to extract various kinds of information, including identity, gender, age, emotional state, location, and accent. In the interest of user privacy, it is desired that only data relevant to the speaker's direct intentions/commands be stored or uploaded to remote computers. Thus, private information should be removed from the voice signal before it is provided to the voice processing SDK. For example, if the intent is a speech recognition task, information on other unrelated recognition activities (e.g., identity, gender, age, emotion, and accent) should be masked/withheld before the voice signal is provided to the voice processing SDK.

BRIEF DESCRIPTION OF THE DISCLOSURE

Exemplary implementations include a system, including a first module and a second module. The first module may be configured to perform operations including generating voice data based on an input audio, anonymizing the voice data by applying a first audio transformation, and transmitting the anonymized voice data to a first remote automatic speech recognition (ASR) module for generating speech recognition data. The second module may be configured to perform operations including separating the input audio into a first data and a second data, anonymizing the first data by applying a second audio transformation to the first data, generating an anonymized audio data by combining the anonymized first data and the second data, and transmitting the anonymized audio data to a second remote ASR module for generating speech recognition data.

Exemplary implementations also include an integrated circuit, including a first module and a second module. The first module may be configured to perform operations including generating voice data based on an input audio, anonymizing the voice data by applying a first audio transformation, and transmitting the anonymized voice data to a first remote ASR module for generating speech recognition data. The second module may be configured to perform operations including separating the input audio into a first data and a second data, anonymizing the first data by applying a second audio transformation to the first data, generating an anonymized audio data by combining the anonymized first data and the second data, and transmitting the anonymized audio data to a second remote ASR module for generating speech recognition data.

Exemplary implementations further include a method including receiving an input audio and a reference signal and selecting one or more modules of a set of modules. In response to selecting a first module, the method includes generating voice data based on the input audio, anonymizing the voice data by applying a first audio transformation, transmitting the anonymized voice data to a first remote ASR module for generating speech recognition data. In response to selecting a second module, the method further includes separating the input audio into a first data and a second data, anonymizing the first data by applying a second audio transformation to the first data, generating an anonymized audio data by combining the anonymized first data and the second data, and transmitting the anonymized audio data to a second remote ASR module for generating speech recognition data.

BRIEF DESCRIPTION OF THE DRAWINGS

Certain features of the subject technology are set forth in the appended claims. However, for the purpose of explanation, several example implementations of the subject technology are set forth in the following figures.

Figure 1:
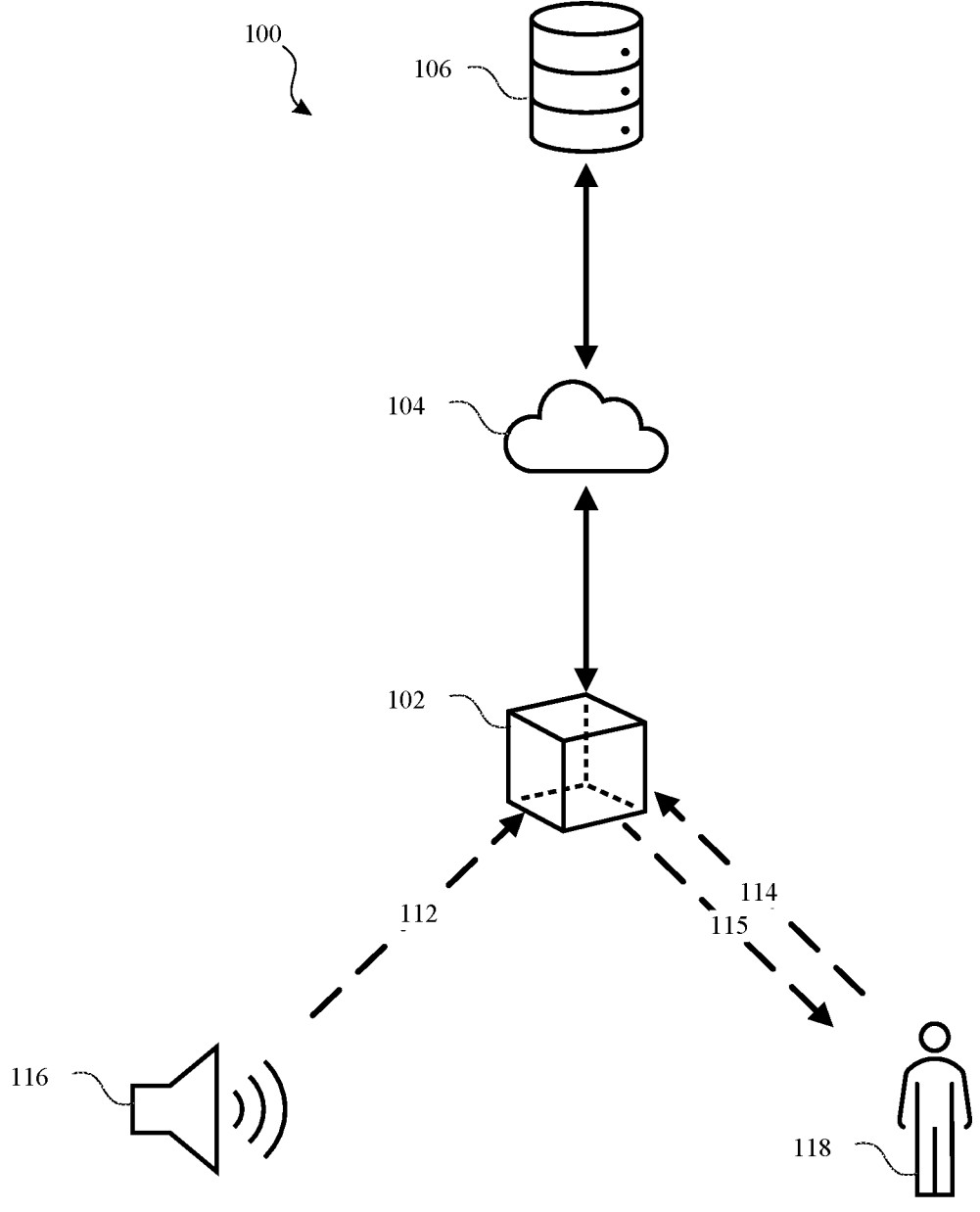
FIG. 1 illustrates an exemplary network configuration of a voice control device, in accordance with one or more aspects of the subject technology.

The figures depict various implementations for purposes of illustration only. One skilled in the art will readily recognize from the following discussion that alternative implementations of the structures and methods illustrated herein may be employed without departing from the principles described herein.

Not all depicted components may be used in all implementations, however, and one or more implementations may include additional or different components than those shown in the figures. Variations in the arrangement and type of the components may be made without departing from the spirit or scope of the claims as set forth herein. Additional components, different components, or fewer components may be provided.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Voice control devices (e.g., smart speakers and voice assistants) may include an SDK for transporting voice data to remote computers. However, the use of such SDKs and offloading voice data to external devices—as performed in the current approaches utilized by voice control devices—may allow remote computers to perform other processing unknown to the user to gather further information about the user, such as data mining for personally identifiable information.

A use of far-field voice (FFV) control devices may be to effectively recognize commands spoken by users far from the FFV control device and in environments having a variety of noise levels, such as environments with music or people talking in the background. To achieve this objective, an array of microphones is typically used. An FFV processing module may first process the audio data captured by the microphone array to enhance the voice content of the audio data (e.g., by removing noise) and then provide the enhanced voice to an ASR module (e.g., a cloud ASR SDK) for recognizing a command in the voice content. If the audio data is sent to a remote computer (e.g., a cloud service), privacy concerns may be raised as the audio samples may include sufficient information for secondary purposes (e.g., detection of identity, gender, age, emotional state, accent, and the like).

Therefore, aspects of the subject technology provide a single system for anonymizing audio data for multiple audio processing pipelines that may use remote computers for audio processing.

FIG. 1 illustrates an exemplary network configuration 100 of a voice control device, in accordance with one or more aspects of the subject technology. A voice control device 102 may be a computer device (e.g., a set-top box, a voice assistant, and the like) for receiving audio data that may contain a command 114 from a user 118. The audio data may be near- or far-field audio data, where near-field audio data may be in proximity to the voice control device 102 (e.g., within 10 feet) and far-field audio data may be distant from the voice control device 102 (e.g., beyond 10 feet). The command 114 may be a process performed by the voice control device 102, such as searching for a query, setting a timer, playing music, and the like. The environment 116 in which the user provides a command 114 to the voice control device 102 may include noise 112, such as music, conversations, and any other ambient sounds.

The voice control device 102 receives audio data, which may include the command 114 from the user 118 and noise 112 from the environment 116. The voice control device 102 may anonymize the audio data before providing the audio data to one or more ASR SDKs. The voice control device 102 may include multiple pipelines for anonymizing the audio data, for example, to provide cross-compatibility among different ASR platforms. The voice control device 102 may also include pipelines for anonymizing the audio data for local ASR, where local ASR includes ASR that can be performed on the voice control device 102 without data leaving the device.

The ASR SDKs of the voice control device 102 may provide the anonymized audio data to a remote computer 106 (e.g., a cloud server) for processing via a network 104. The remote computer 106 may be any device that is external to the voice control device 102. For example, the remote computer 106 may be a cloud server off-premises from the voice control device 102. The processing may include voice separation, speech recognition, command identification, and the like. The processing results may be used by the remote computer 106 for executing the command 114 and providing the results of the command 114 to the voice control device 102. The processing results may also or instead be sent to the voice control device 102 for executing the command 114 and/or providing the results of the command 114 as feedback 115 to the user 118.

Figure 2:
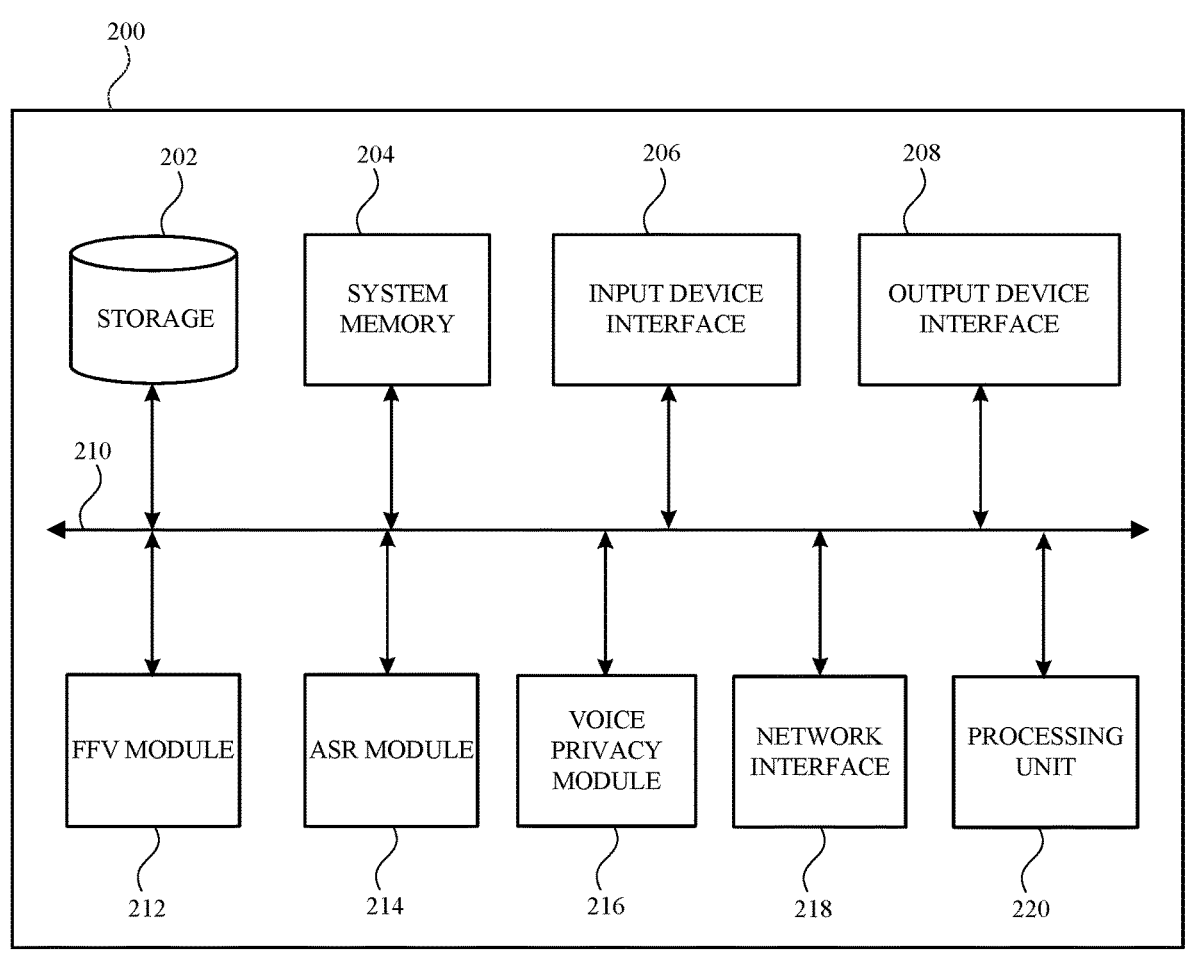
FIG. 2 illustrates an exemplary voice control device, in accordance with one or more aspects of the subject technology.

FIG. 2 illustrates a block diagram of an exemplary computing system 200 in accordance with one or more aspects of the subject technology. The computing system 200 may be, and/or may be a part of, the voice control device 102, as shown in FIG. 1. The computing system 200 may include various types of computer-readable media and interfaces for various other types of computer-readable media. The computing system 200 includes a bus 210, a processing unit 220, a storage device 202, a system memory 204, an input device interface 206, an output device interface 208, an FFV module 212, an ASR module 214, a voice privacy module 216, and/or a network interface 218.

The bus 210 collectively represents all system, peripheral, and chipset buses that communicatively connect the numerous internal devices of the computing system 200. In one or more implementations, the bus 210 communicatively connects the processing unit 220 with the other components of the computing system 200. From various memory units, the processing unit 220 retrieves instructions to execute and data to process in order to execute the operations of the subject disclosure. The processing unit 220 may be a controller and/or a single- or multi-core processor or processors in various implementations.

The bus 210 also connects to the input device interface 206 and output device interface 208. The input device interface 206 enables the system to receive inputs. For example, the input device interface 206 allows a user to communicate information and select commands on the system 200. The input device interface 206 may be used with input devices such as keyboards, mice, and other user input devices, as well as microphones (e.g., microphone arrays), cameras, and other sensor devices. The output device interface 208 may enable, for example, a display of images generated by computing system 200. Output devices that may be used with the output device interface 208 may include, for example, printers and display devices, such as a liquid crystal display (LCD), a light emitting diode (LED) display, an organic light emitting diode (OLED) display, a flexible display, a flat panel display, a solid-state display, a projector, speakers (e.g., speaker arrays), haptic, or any other device for outputting information. One or more implementations may include devices that function as both input and output devices, such as a touchscreen.

The bus 210 also couples the system 200 to one or more networks and/or to one or more network nodes through the network interface 218. The network interface 218 may include one or more interfaces that allow the system 200 to be a part of a network of computers (such as a local area network (LAN), a wide area network (WAN), or a network of networks (the "Internet")). Any or all components of the system 200 may be used in conjunction with the subject disclosure.

The FFV module 212 may include hardware and/or software for processing far-field voice data. The FFV module 212 may include one or more algorithms (e.g., computer-readable instructions) that include accessing audio input captured from a microphone array (e.g., the input device interface 206) and separates and/or enhances the audio data from target sources (e.g., the user 118) for applications, such as ASR, which can use remote (e.g., cloud) voice services and/or local (e.g., on-the-edge) voice services. The FFV module 212 may include one or more algorithms (e.g., computer-readable instructions) for acoustic echo cancelation (AEC), which may be used to remove audio output by the system 200 that is subsequently captured back by the system 200. For example, the system 200 may be playing music when a user command is received; the audio captured by a microphone of the system may include both the music and the user utterance (e.g., a command). AEC may include accessing one or more reference signals destined for integrated and/or external speakers (e.g., the output device interface 208), receiving audio from microphones (e.g., the input device interface 206), and removing parts of the received audio that the system knows was output from the system 200 generated based on the reference signal.

The ASR module 214 may include hardware and/or software for performing ASR on voice data. Performing ASR on voice data may include receiving voice data and extracting speech recognition data. Speech recognition data may include speech, words, commands, intentions, and the like. ASR may be performed via a hidden Markov model, dynamic time warping, machine learning model (e.g., neural networks), end-to-end ASR, and the like.

The voice privacy module 216 may include hardware and/or software preparing voice data for input into one or more ASR SDKs. The voice privacy module 216 may include one or more algorithms for anonymizing voice data according to one or more voice processing pipelines, which may include one or more steps where the output of one step is the input to the next. Pipelines may share resources with other pipelines and may operate concurrently. Example pipelines are described below with respect to FIG. 3, FIG. 4, FIG. 5, and FIG. 6. In one or more implementations, voice processing pipelines may be separated into their own modules such that each module includes hardware and/or software for executing a voice processing pipeline.

The storage device 202 may be a read-and-write memory device. The storage device 202 may be a non-volatile memory unit that stores instructions and data (e.g., static and dynamic instructions and data) even when the computing system 200 is off. In one or more implementations, a mass-storage device (such as a solid-state, magnetic or optical disk and its corresponding disk drive) may be used as the storage device 202. In one or more implementations, a removable storage device (such as a floppy disk, flash drive, and its corresponding disk drive) may be used as the storage device 202.

Like the storage device 202, the system memory 204 may be a read-and-write memory device. However, unlike the storage device 202, the system memory 204 may be a volatile read-and-write memory, such as random-access memory. The system memory 204 may store any of the instructions and data that one or more processing unit 220 may need at runtime to perform operations. In one or more implementations, the processes of the subject disclosure are stored in the system memory 204 and/or the storage device 202. From these various memory units, the one or more processing units 220 retrieves instructions to execute and data to process in order to execute the processes of one or more implementations.

Implementations within the scope of the subject technology may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general purpose or special purpose computing device, including any processing electronics and/or processing circuitry capable of executing instructions. For example, without limitation, the computer-readable medium may include any volatile semiconductor memory (e.g., the system memory 204), such as RAM, DRAM, SRAM, T-RAM, Z-RAM, and TTRAM. The computer-readable medium also may include any non-volatile semiconductor memory (e.g., the storage device 202), such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more implementations, the tangible computer-readable storage medium may be directly coupled to a computing device, while in other implementations, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, binaries, modules, applications, applets, functions, SDKs, frameworks, and the like. As recognized by those of skill in the art, details including, but not limited to, the number, structure, sequence, and organization of instructions may vary significantly without varying the underlying logic, function, processing, and output. It is intended that "modules" as used herein not only refers the computer-executable instructions but also or instead to hardware (e.g., computer circuitry) that may carry out the processes described herein.

While the above discussion primarily refers to microprocessors or multi-core processors that execute software, one or more implementations are performed by one or more integrated circuits, such as DSPs, ASICs or FPGAs. In one or more implementations, such integrated circuits execute instructions that are stored on the circuit itself.

Figure 3:
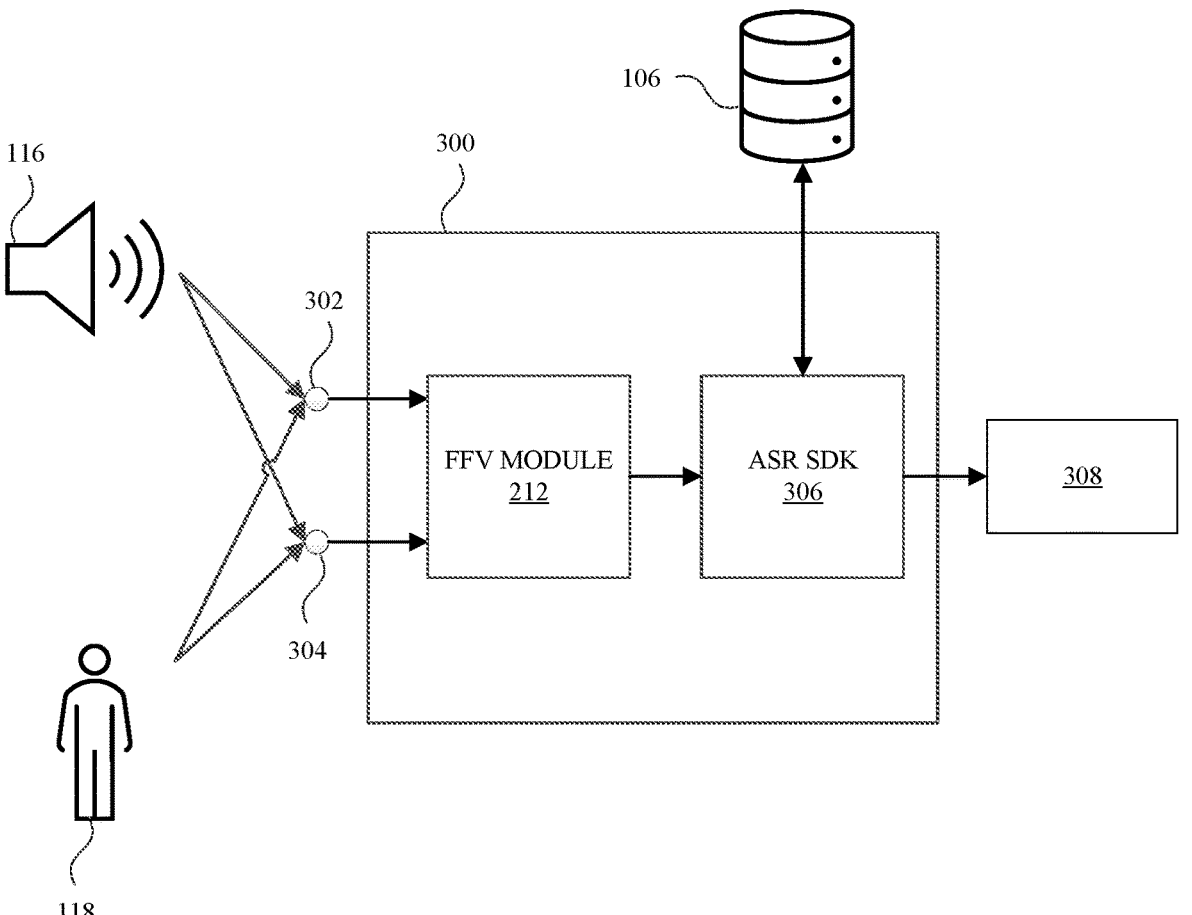
FIG. 3 illustrates a schematic diagram of a first approach for far-field voice control.

FIG. 3 illustrates a schematic diagram of an approach 300 for FFV control. The approach 300 includes separate FFV and ASR SDK modules. In neither module is voice anonymization performed. The approach 300 may be performed on a chip within the voice control device 102. Microphones 302, 304 of the voice control device 102 may receive audio data from the user 118 and/or the environment 116. It should be understood that the approach 300 is not limited to a two-microphone array and may control more or fewer microphones.

The microphones 302, 304 pass the audio data to the FFV module 212. The audio data is processed by the FFV module 212, the output of which is provided to an ASR SDK 306. Processing may include voice extraction/enhancement. The output of the FFV module 212 may include the voice data of the user 118 extracted from the audio data. The ASR SDK 306 may send the voice data to the remote computer 106 (e.g., cloud server), and the remote computer 106 may perform ASR on the voice data (e.g., to determine the command in the voice data). The result of the ASR from the remote computer 106 may be sent to the ASR SDK 306 for further processing and/or for providing as output speech recognition data 308 to the rest of the voice control device 102.

The ASR SDK 306 may be provided by a third party (e.g., the ASR provider). From the perspective of the voice control device 102, the ASR SDK 306 is a black box that receives a form of the audio data and outputs speech recognition data 308, which may include commands, text, audio, and the like, from the audio data as determined by the remote computer 106 via the ASR SDK 306.

Figure 4:
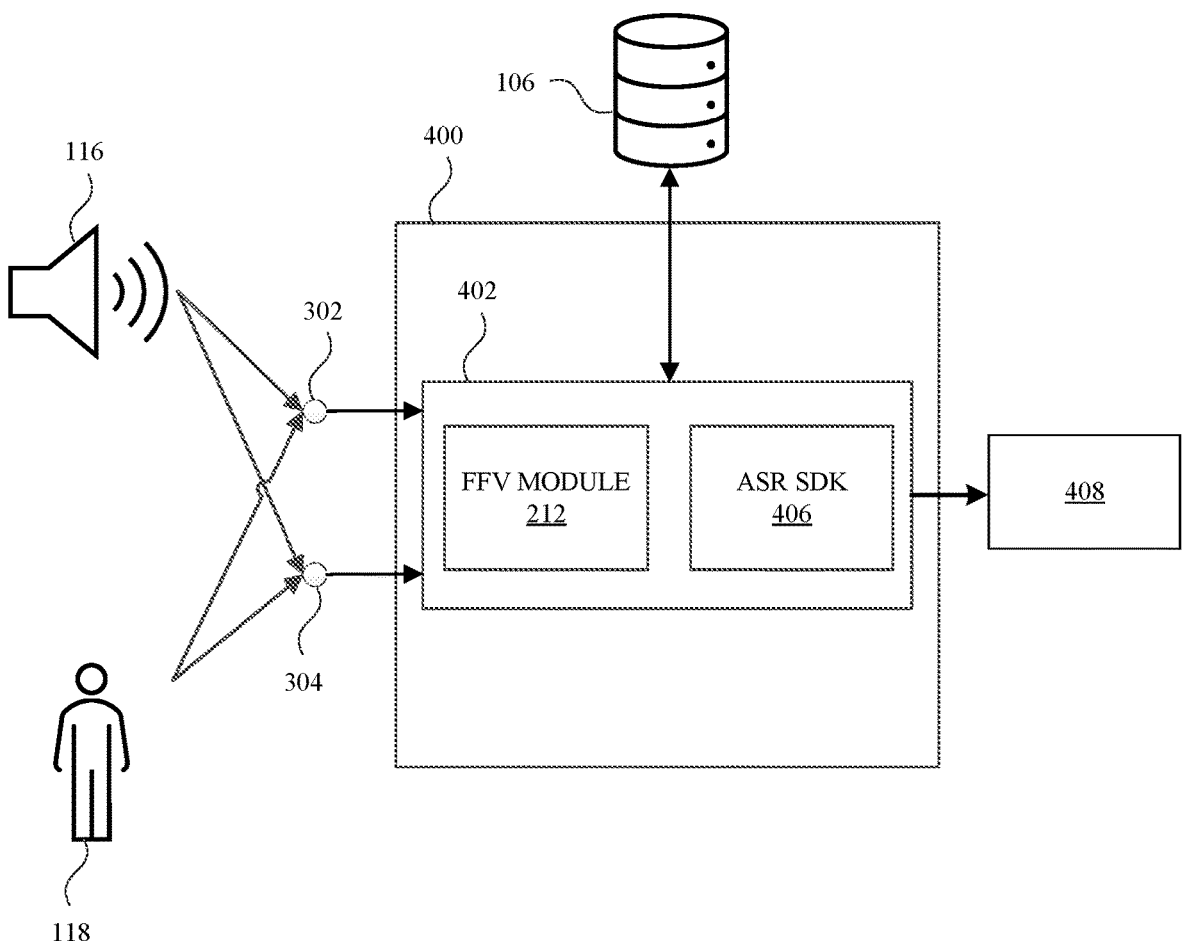
FIG. 4 illustrates a schematic diagram of a second approach for far-field voice control.

FIG. 4 illustrates a schematic diagram of another approach 400 for FFV control. The approach 400 includes a combined FFV and ASR SDK modules (the combined module 402). Voice anonymization is not performed in any of the modules (e.g., combined module 402, FFV module 212, and/or ASR SDK 406) prior to sending the voice data to a remote computer (e.g., the remote computer 106). The approach 400 may be performed on a chip within the voice control device 102. Microphones 302, 304 of the voice control device 102 may receive audio data from the user 118 and/or the environment 116. It should be understood that the approach 400 is not limited to a two-microphone array and may control more or less microphones.

The microphones 302, 304 pass the audio data to the combined module 402. Like the ASR SDK 306, the combined module 402 may be provided by a third party and is treated as a black box from the perspective of the voice control device 102. In the approach 400, it is almost entirely up to the combined module 402 how to process the audio data (e.g., how to generate the voice data from the audio data) and how it is moved between the voice control device 102 and the remote computer 106. The combined module 402 receives the audio data and outputs speech recognition data 408, which may include commands, text, and the like, from the audio data, as determined by the remote computer 106 via the ASR SDK 406. In one or more implementations, the functions of the FFV module 212 are performed at the remote computer 106.

Figure 5:
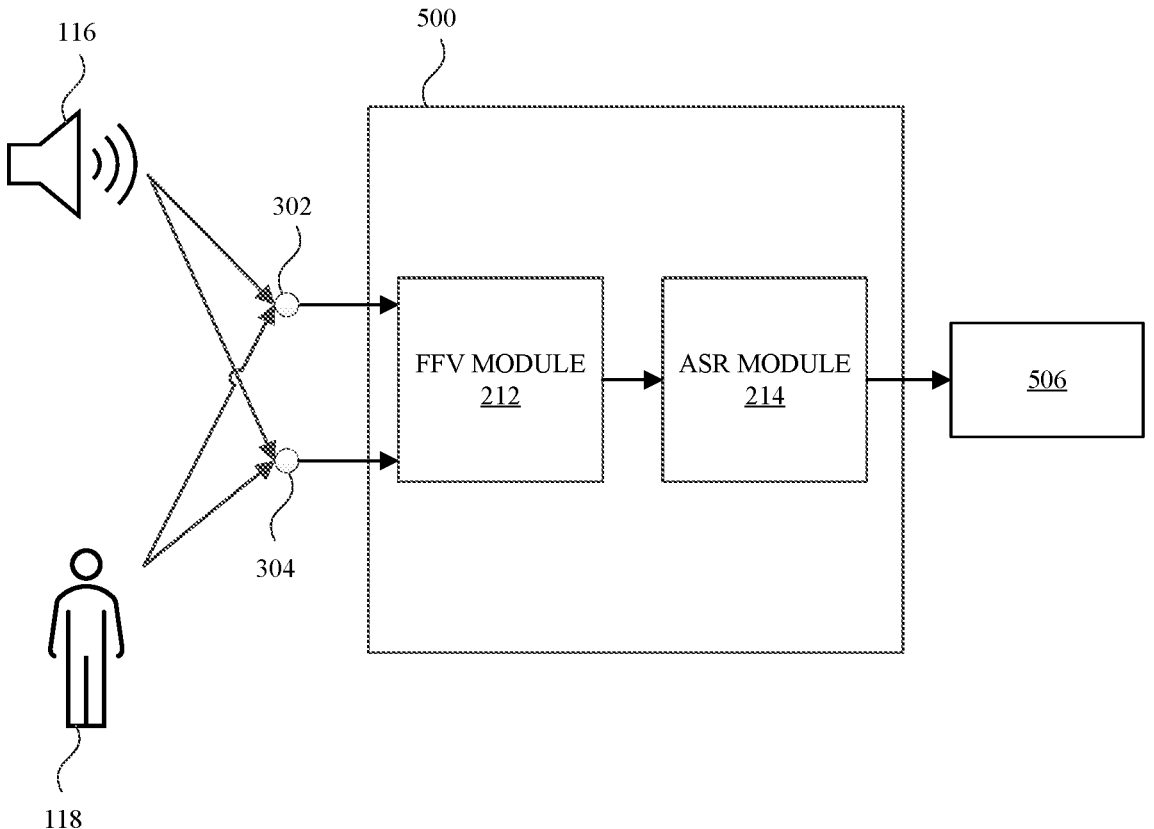
FIG. 5 illustrates a schematic diagram of a third approach for far-field voice control.

FIG. 5 illustrates a schematic diagram of yet another approach 500 for FFV control. The approach 500 includes an FFV module 212 and an ASR module 214. The approach 500 may also be performed on a chip within the voice control device 102. Microphones 302, 304 of the voice control device 102 may receive audio data from the user 118 and/or the environment 116. It should be understood that the approach 500 is not limited to a two-microphone array and may control more or fewer microphones.

The microphones 302, 304 pass the audio data to the FFV module 212. The audio data is processed by the FFV module 212, the output of which is provided to ASR module 214. The output of the FFV module 212 may include the voice data of the user 118. The ASR module 214 may receive the voice data for performing ASR locally on the voice control device 102. In one or more implementations, the FFV module 212 and the ASR module 214 may be a combined module, similar to the combined module 402. The output speech recognition data 506 of the ASR module 214 may include commands, text, and the like, from the voice data.

This approach has the highest order of privacy, as compared to the approaches of FIG. 3 and FIG. 4, as voice samples do not leave the voice control device 102 (e.g., to the remote computer 106). The drawback to the approach of FIG. 5 is that the voice control device 102 is limited to its own computational resources, which may negatively impact the performance of the ASR.

Figure 6:
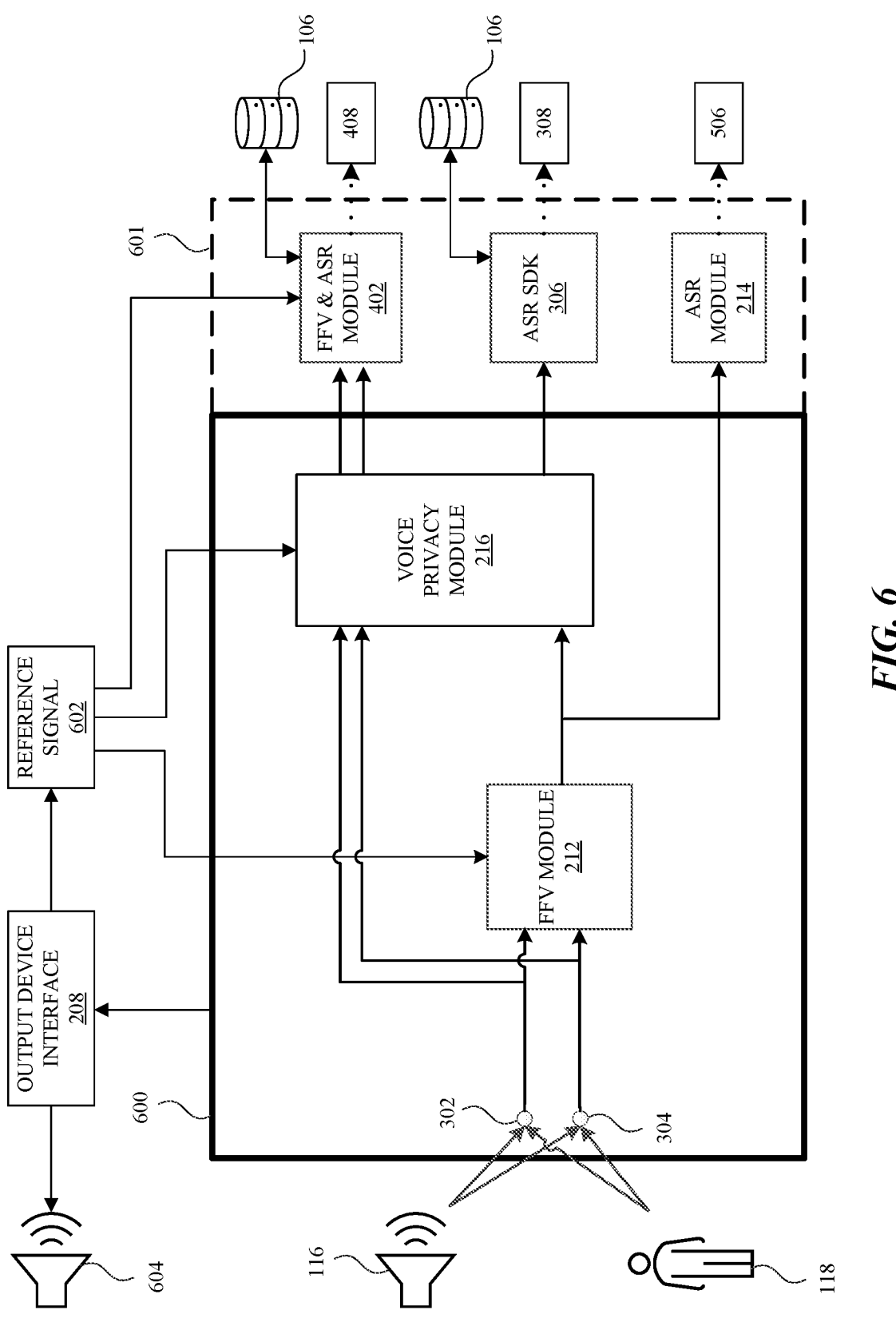
FIG. 6 illustrates a schematic diagram of a voice anonymization system for far-field voice control, in accordance with one or more aspects of the subject technology.

FIG. 6 illustrates a schematic diagram of a voice anonymization system 600 for FFV control, in accordance with one or more aspects of the subject technology. The voice anonymization system 600 prepares audio data for ASR processing and allows for a voice control device 102 to have compatibility across multiple ASR platforms while maintaining the privacy of the user 118. The system 600 may be a part of a voice control device 102 and may include an FFV module 212 and a voice privacy module 216. In one or more implementations, the system 600 may also include one or more of the microphones 302, 304. For example, the microphones 302, 304 may be connected to or integrated with the system 600. The system 600 may be a single integrated circuit on the voice control device 102. Microphones 302, 304 of the voice anonymization system 600 may receive audio data from the user 118, the environment 116, and/or a speaker 604 (e.g., integrated with or connected to the voice control device 102). It should be understood that the system 600 is not limited to a two-microphone array as shown and may control more or fewer microphones.

The microphones 302, 304 pass the audio data to the FFV module 212. The audio data is processed by the FFV module 212, the output of which is provided to the voice privacy module 216. The microphones 302, 304 may also or instead pass the audio data to the voice privacy module 216 for subsequent modules that may incorporate FFV.

At the FFV module 212, the audio data may be processed and provided to the voice privacy module 216. Processing may include voice extraction/enhancement. The processing may also include acoustic echo cancelation, which removes the reference signal 602 (e.g., audio output by the voice control device 102) from the audio data. The reference signal 602 may be a signal received by the output device interface 208 for outputting via a speaker 604. The output device interface 208 may be either external to 600 or part of 600 itself. The output of the FFV module 212 may be the voice data of the user 118. In one or more implementations, the output of the FFV module 212 may also be output to the ASR module 214 (inside or outside the system 600), which in turn outputs speech recognition data 506 (e.g., words, commands, and the like) without using any remote computer or cloud services.

At the voice privacy module 216, the audio data is anonymized. The voice privacy module 216 receives the audio data and anonymizes audio data for the ASR SDK 306. The ASR SDK 306 may send the anonymized audio data to a remote computer 106 for ASR, receive the speech recognition data 308 from the remote computer 106, and subsequently output the speech recognition data 308 for an application. The voice privacy module 216 also or instead processes the audio data to separate the voice data of the user 118 from the rest of the audio data, anonymize the voice data, and combine the anonymized voice data with the rest of the audio data such that the audio data is untouched except the voice data of the user 118 is anonymized. The voice privacy module 216 may output the anonymized voice data for the combined module 402 (including the ASR SDK 406), which may send the anonymized voice data to a remote computer 106 for ASR, receive the speech recognition data 408 from the remote computer 106, and subsequently output the speech recognition data 408 for an application. In one or more implementations, the voice privacy module 216 may also remove the reference signal 602 via AEC. Details regarding the processes performed by the voice privacy module 216 are discussed in more detail below with respect to FIG. 7, FIG. 8, FIG. 9, and FIG. 10.

In one or more implementations, one or more ASR SDKs and/or one or more ASR module may be included as part of the system 600. For example, extension 601 may be an extension of the system 600 such that system 600 and extension 601 are on the same chip. As another example, extension 601 may be a separate chip connected to the system 600.

Figure 7:
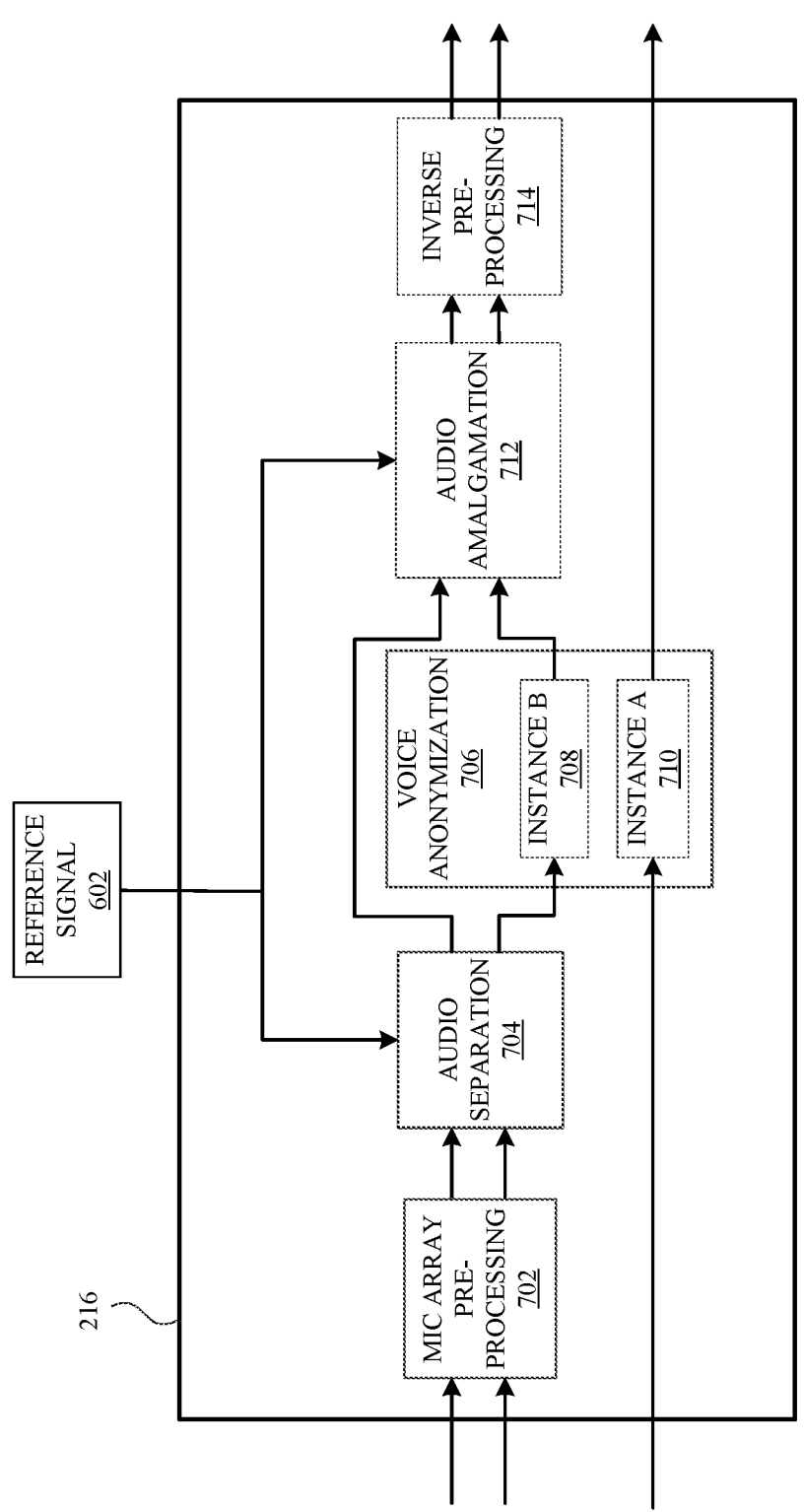
FIG. 7 illustrates a schematic diagram of a voice privacy module, in accordance with one or more aspects of the subject technology.

FIG. 7 illustrates a schematic diagram of the voice privacy module 216, in accordance with one or more aspects of the subject technology. The voice privacy module 216 anonymizes the voice data in an audio data before sending the anonymized audio data to an ASR SDK (e.g., for remote ASR).

The audio data may be received from at least one microphone (e.g., a microphone array). An FFV processing module (e.g., FFV module 212) may receive the audio data and output voice data of the user 118 based on the audio data. The voice privacy module 216 may receive the voice data and anonymize the voice data in an instance 710 of a voice anonymization algorithm of the anonymization module 706. The voice anonymization algorithm may be any voice anonymization method, such as a vocoder, x-vector-based voice conversion, and the like, and may include transforming any acoustic characteristic such as pitch, formant, inflection, timbre, and the like, and/or non-acoustic characteristic such as inflection and grammar. The voice privacy module 216 outputs the anonymized voice data.

Additionally or alternatively, the voice privacy module 216 receives the audio data received from at least one microphone (e.g., a microphone array). The voice privacy module 216 may separate the audio data at an audio source separation module 704 into at least a voice data and a noise data, and anonymize the voice data at a voice anonymization module 706 in an instance 708 of a voice anonymization algorithm of the anonymization module 706. The instance 708 may utilize the same or different voice anonymization algorithm as instance 710 and may be in the same or separate voice anonymization module 706. The anonymization module 706 may output an anonymized voice data. The anonymized voice audio is combined with the other audio data and then is output as anonymized audio data.

In one or more implementations, the audio data may be pre-processed at the microphone array pre-processing module 702, before the audio source separation. The pre-processing module 702 is configured to enhance the performance of the audio source separation module 704 by modifying the audio data to emphasize the voice data of the user 118 in the audio data. For example, the pre-processing module 702 may perform transformations on the audio such as boosting the gain of the audio data and applying a high-pass filter to cut the frequencies below the frequencies of the voice data of the user 118. The pre-processed audio data may be output to the audio source separation module 704 to separate the voice data of the user 118 from the rest of the audio data.

In one or more implementations, the pre-processing transformation(s) applied at the pre-processing module 702 may be inversed at the inverse pre-processing module 714. The inverse pre-processing module 714 may modify the anonymized audio data to return the audio data to its original state but with the voice data anonymized. For example, if the pre-processing module 702 applies a gain boost and a high-pass filter to the audio data, the inverse pre-processing module 714 applies the inverse of the high-pass filter and gain boost on the anonymized audio data.

Figure 8:
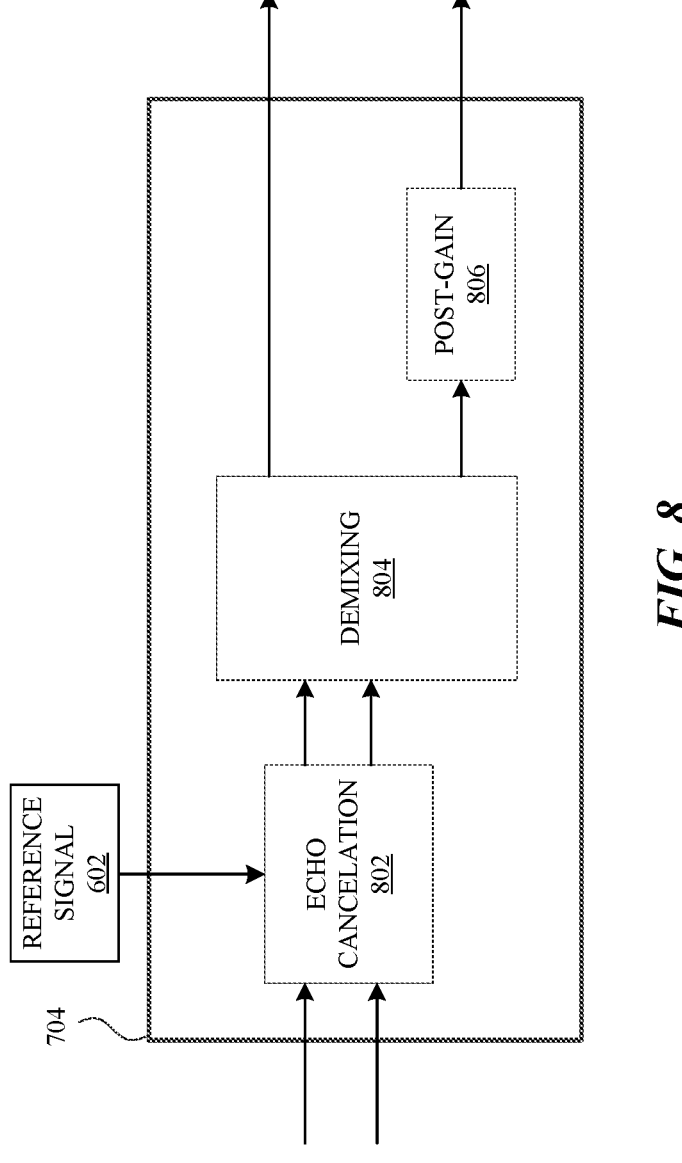
FIG. 8 illustrates a schematic diagram of a data separation process, in accordance with one or more aspects of the subject technology.

FIG. 8 illustrates a schematic diagram of an audio source separation process, in accordance with one or more aspects of the subject technology. The audio source separation process may be performed by the audio source separation module 704. The audio source separation module 704 may include an echo cancelation module 802 configured to cancel audio feedback from the audio data played on the voice control device 102 (e.g., the reference signal 602). To cancel the audio feedback, the audio source separation module 704 may perform acoustic echo cancelation to remove an echo from the audio data (e.g., the pre-processed audio data), which was generated based on the reference signal 602.

The audio source separation module 704 may also be configured to separate the audio data into at least a voice data and a noise data at a demixing module 804. To separate the audio data, the demixing module 804 may perform blind source separation, beamforming, or any other audio data separation algorithms. The output of the audio separation may include a voice data and a noise data (e.g., the background noise, output noise). The audio source separation module 704 may also be configured to apply further processing to the voice data to enhance the anonymization process (e.g., increase anonymization efficiency, reduce noise that may result from anonymization, and the like) at a post-gain module 806. For example, the post-gain module 806 may increase the gain of the audio data. The voice audio may be output to the voice anonymization module 706.

Figure 9:
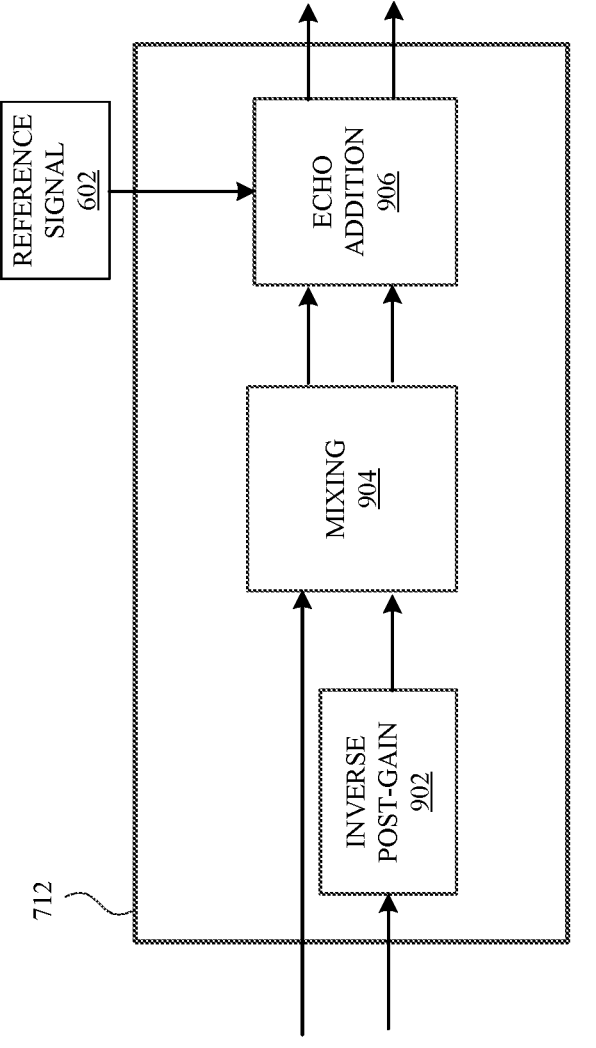
FIG. 9 illustrates a schematic diagram of a data amalgamation process, in accordance with one or more aspects of the subject technology.

FIG. 9 illustrates a schematic diagram of a data amalgamation process, in accordance with one or more aspects of the subject technology. The data amalgamation process may be performed by the audio amalgamation module 712. The audio amalgamation module 712 may be configured to combine the voice data, the noise data, and/or the reference signal 602 such that the output of the audio amalgamation module is substantially the same as the audio data input to the voice privacy module 216 but with the voice data anonymized. To combine the audio data, the post-gain applied by the post-gain module 806 may be inversed by the inverse post-gain module 902. For example, if the post-gain module 806 increases the gain of the voice data, the inverse post-gain module 902 may apply a decrease of the gain of the voice data.

The audio amalgamation module 712 may also be configured to mix (e.g., combine) the voice data and the noise data. For example, mixing voice data and the noise data may include inversing the separation performed at the demixing module 804. The output of the mixing module 904, therefore, is anonymized audio data (e.g., an anonymized version of the original audio data), in which the voice data is anonymized. An echo addition module 906 of the audio amalgamation module 712 may mix (e.g., combine) the anonymized audio data with the reference signal 602 by inversing the acoustic echo cancelation algorithm used at the echo cancelation module 802. The output of the audio amalgamation module 712 is substantially the same as the audio data input to the audio source separation module 704 but with voice data anonymized.

Figure 10:
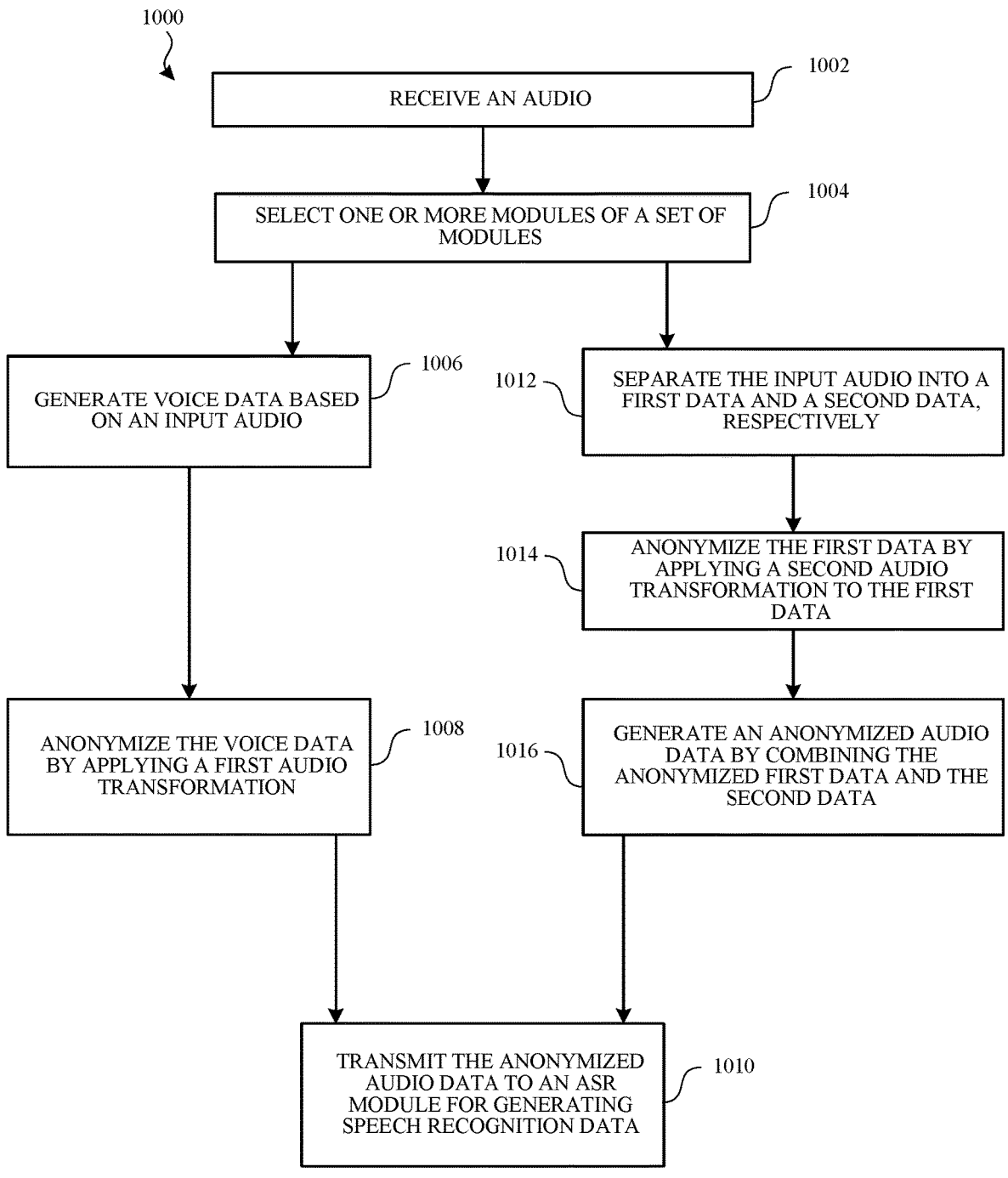
FIG. 10 illustrates a flow diagram of an example process for voice privacy for far-field voice control devices, in accordance with one or more aspects of the subject technology.

FIG. 10 illustrates a flow diagram of a process 1000 for voice privacy for FFV control devices, in accordance with one or more aspects of the subject technology. For explanatory purposes, the process 1000 is primarily described herein with reference to the previous figures. However, the process 1000 is not limited to the system 600, and one or more blocks (or operations) of the process 1000 may be performed by one or more other components of other suitable devices. Further, for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

In the process 1000, voice data included in audio data may be anonymized while keeping the audio data in a format (e.g., single- or multi-stream) compatible with one or more ASR SDKs. At block 1002, an input audio may be received by the system 600. The input audio data may be received by one or more microphones (e.g., microphones 302, 304). The input audio data may include audio data from a user (e.g., user 118), other sources (e.g., environment 116). In one or more implementations, the reference signal (e.g., reference signal 602) may also be received from the voice control device's 102 output device interface 208 corresponding to the audio being played on the speaker 604, internal and/or external to the voice control device 102.

At block 1004, one or more audio data anonymization pipelines (or "pipelines") may be selected. Audio data anonymization pipelines may be embodied by one or more pipeline modules. The pipeline modules may include hardware and/or software that execute one or more processes described herein and may include other modules including an FFV module 212 and a voice privacy module 216. The system 600 may have a default selection of one or more audio data anonymization pipelines. For example, the system 600 may be configured in hardware to route the audio data to one or more pipelines. The selection may also or instead be configured by or for an application (e.g., an ASR SDK, an audio recorder, a voice assistant, and the like) that utilizes the system 600 to route audio data through one or more pipelines that lead to a combined module 402, ASR SDK 306, and/or ASR module 214 appropriate for the application. For example, an application may receive as input audio data, which indicates that the combined module 402 (including ASR SDK 406) should be utilized by the system 600. As another example, the installation of one or more of applications onto the voice control device may include sending a message to a controller (e.g., processing unit 220) that then sends an instruction to the system 600 directing it to route the audio data to one or more pipelines. As yet another example, the combined module 402, ASR SDK 306, and/or ASR module 214 may send an instruction to the system 600 directing the system 600 to send the audio data to one or more pipelines.

In one or more implementations, the audio data anonymization pipelines that are used may depend on the type of ASR SDK utilized by an application of the voice control device. If an ASR SDK receives voice data, like the approach 300 for FFV control, the process may proceed to block 1006. If an ASR SDK also or instead utilizes the audio data, like the approach 400 for FFV control, the process may also or instead proceed to block 1012. In one or more implementations, the ASR may be performed locally, in which case the system 600 may also or instead perform FFV processing on the audio data via the FFV module 212 and pass the output results to the local ASR module 214 to generate speech recognition data 506. In one or more implementations, multiple approaches may be run in parallel to, for example, utilize multiple ASRs (e.g., local and/or external) simultaneously.

At block 1006, processed audio data may be generated based on the received audio data. The audio data may be input to an FFV module 212 configured to extract, isolate, or enhance one or more sources from the audio data, such as the voice data of the user 118. For example, noise data (e.g., background noise, device output noise) may be removed from the audio data to isolate the voice data of the user 118. The output of the FFV module 212 may be the voice data of the user 118). The FFV module 212 may perform one or more audio processing techniques, including acoustic echo cancelation, audio source separation, and the like. Acoustic echo cancelation may include removing the echo (e.g., the audio output from the voice control device 102) from the audio data based on the reference signal 602.

At block 1008, anonymized audio data may be generated based on the processed audio data and a transformation to the audio data. A voice privacy module (e.g., the voice privacy module 216) may be configured to anonymize voice data and output the anonymized voice data to an ASR SDK (e.g., ASR SDK 306) such that personally identifiable information (e.g., identity, gender, age, accent, and the like) cannot be determined based on the anonymized voice data. Anonymizing the voice data may include applying one or more transformations to the voice data. Transformations may include modulating frequency, pitch, formant, and amplitude. Transformations may also or instead include non-acoustic changes, such as changing grammar and neutralizing inflections. The voice privacy module may include analog and/or digital signal processing methods, such as vocoders, x-vector-based voice conversion, and the like. It should be understood that the voice privacy module 216 is not limited to any particular voice anonymization technique.

At block 1010, the anonymized voice data may be transmitted to a remote ASR module (e.g., remote computer 106) for outputting speech recognition data (e.g., speech recognition data 308). The ASR SDK (e.g., ASR SDK 306) may be utilized (e.g., via hardware and/or software) in the voice control device to manage the communication between the voice control device and the remote ASR module. The ASR SDK may receive anonymized voice data from the voice privacy module. The anonymized voice data may be sent to the remote ASR module associated with the ASR SDK for performing ASR. The ASR SDK may receive data (e.g., speech recognition data) from the remote ASR module and may also output the received data for further use (e.g., by applications on the voice control device).

For example, a first company may manufacture and configure voice control devices for consumer use. A second company may operate a cloud computing infrastructure with speech recognition capabilities. The second company may provide an ASR SDK for manufacturers, such as the first company, to utilize the second company's cloud computing infrastructure, which reduces the computational power needed for voice control devices. A voice control device that utilizes the subject technology may extract, enhance, and/or anonymize the voice data of a user to preserve the privacy of the user as the ASR SDK performs unknown operations on the voice data, which likely does not include privacy preserving measures.

At block 1012, the audio data may be separated (e.g., by an audio source separation module 704) into at least a voice data and a noise data (e.g., the rest of the audio data). To separate the audio data, audio source separation algorithms, such as blind source separation and/or beamforming, may be utilized.

In one or more implementations, the audio data may first be processed by an echo cancelation process (e.g., via echo cancelation module 802) that cancels audio feedback from the audio data played on the voice control device (e.g., the reference signal 602). To cancel the audio feedback, an AEC algorithm may remove from the audio data at least audio created by the voice control device based on the reference signal.

In one or more implementations, after audio source separation, the voice data may be processed (e.g., via post-gain module 806) to improve the anonymization process. For example, a gain of the voice data may be increased to increase anonymization efficiency and/or reduce noise that may result from anonymization.

In one or more implementations, the audio data may be pre-processed (e.g., via a microphone array pre-processing module 702) before separating the audio data. The purpose of pre-processing the data is to enhance the performance of at least the audio source separation process. A transformation may be applied to the audio data to generate the pre-processed audio data. The transformation may include the same or different aspects of the transformation from block 1008. The transformations applied to the audio data may include a gain adjustment (e.g., gain boost) of the audio data and/or applying a high-pass filter to cut frequencies below that of the voice data of the user (e.g., the user 118).

At block 1014, the voice data may be anonymized (e.g., via a voice anonymization module 706). The voice data may be anonymized in a manner similar to the voice data at block 1008. For example, the anonymization process performed on the voice data may be a second instance (e.g., instance B 708) of the anonymization process performed on the processed audio data at block 1008 (e.g., instance A 710). In one or more implementations, the anonymization at block 1008 may be randomly or otherwise modified for anonymizing the voice data. In one or more implementations, the voice data may be anonymized in a manner different than the processed audio data at block 1008 (e.g., there may be a second, separation voice anonymization module for the voice data rather than a separate instance of the same voice anonymization module).

At block 1016, the anonymized voice data may be combined with the remaining audio data to form anonymized audio data. An audio amalgamation module (e.g., audio amalgamation module 712) may combine the voice data with the noise data and/or the reference signal. The result would be anonymized audio data that resembles the audio data input to the voice privacy module, except that the voice data of the user 118 is anonymized such that the personally identifiable information of the user cannot be extracted from the audio data.

The audio amalgamation module may inverse the post-gain applied to the voice data at block 1012 (e.g., at a post-gain module 806). For example, if the gain of the voice data was increased by 0.5 dB, then the gain of the anonymized voice data may be reduced by 0.5 dB (e.g., at the inverse post-gain module 902). The voice data and the other audio data may also be mixed together. Mixing (e.g., combining) the components of the audio data together may include inversing the data separation performed at block 1012. For example, part of the blind source separation algorithm includes generating a set of demixing weights, which may be used to derive the original audio mix despite the voice anonymization. The echo cancelation may also be inversed from the anonymized audio data (e.g., the mixed audio data with the anonymized voice data). For example, part of the acoustic echo cancelation may include generating a set of acoustic echo cancelation filter taps, which may be used to derive the original audio mix, including the reference signal.

In one or more implementations, the pre-processing applied at block 1012 may be inversed. For example, if a gain adjustment (e.g., gain boost) and a high-pass filter were applied to the audio data, a similar gain adjustment and high-pass filter would be inversed from the anonymized audio data.

At block 1010, the anonymized audio data may be transmitted to a remote ASR module (e.g., remote computer 106) for generating speech recognition data (e.g., speech recognition data 408). The ASR SDK (e.g., ASR SDK 406 of the combined module 402) may be utilized (e.g., via hardware and/or software) in the voice control device to manage the communication between the voice control device and the remote ASR module. In one or more implementations, the ASR SDK may be the same ASR SDK utilized following block 1008.

Those skilled in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. For example, the described functionality may be implemented as a variety of subroutines in a single software program executed by a processor. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine (e.g., her) and vice versa. Headings and subheadings, if any, are used for convenience only and do not limit the subject disclosure.

What is claimed is:

1. A system, comprising:
a first module of a set of modules configured to perform operations comprising:
  generating voice data based on an input audio;
  anonymizing the voice data by applying a first audio transformation; and
  transmitting the anonymized voice data to a first remote automatic speech recognition (ASR) module for generating speech recognition data; and
a second module of a set of modules configured to perform operations comprising:
  separating the input audio into a first data and a second data;
  anonymizing the first data by applying a second audio transformation to the first data;
  generating an anonymized audio data by combining the anonymized first data and the second data; and
  transmitting the anonymized audio data to a second remote ASR module for generating speech recognition data.

2. The system of claim 1, further comprising:
a controller configured to perform operations comprising:
  receiving an instruction from an application; and
  selecting one or more modules of the set of modules based on the instruction.

3. The system of claim 1, further comprising:
a third module of the set of modules configured to perform operations comprising:
  generating a second voice data based on the input audio; and
  providing the second voice data as input to a local ASR module for generating speech recognition data.

4. The system of claim 1, wherein:
one or more of the first audio transformation or the second audio transformation includes modulating at least one of frequency, pitch, formant, amplitude, inflection, or grammar.

5. The system of claim 1, wherein the separating of the input audio into the first data and the second data comprises:
  determining whether an echo is present in the input audio based on a reference signal;
    removing an echo from the input audio based on the reference signal, in response to determining that an echo is present in the input audio;
    demixing the first data and the second data from the input audio; and
    increasing a gain of the first data.

6. The system of claim 5, wherein combining the anonymized first data and the second data comprises:
  decreasing the gain of the anonymized first data;
  mixing the anonymized first data and the second data to generate the anonymized audio data; and
  adding the reference signal to the anonymized audio data.
  7. An integrated circuit, comprising:
  a first module of a set of modules configured to perform operations comprising:
    generating voice data based on an input audio;
    anonymizing the voice data by applying a first audio transformation; and
    transmitting the anonymized voice data to a first remote automatic speech recognition (ASR) module for generating speech recognition data; and
  a second module of the set of modules configured to perform operations comprising:
    separating the input audio into a first data and a second data;
    anonymizing the first data by applying a second audio transformation to the first data;
    generating an anonymized audio data by combining the anonymized first data and the second data; and
    transmitting the anonymized audio data to a second remote ASR module for generating speech recognition data.
  8. The integrated circuit of claim 7, further comprising:
  a controller configured to perform operations comprising:
    receiving an instruction from an application; and
    selecting one or more modules of the set of modules based on the instruction.
  9. The integrated circuit of claim 7, further comprising:
  a third module of the set of modules configured to perform operations comprising:
    generating a second voice data based on the input audio; and
    providing the second voice data as input to a local ASR module for generating speech recognition data.
  10. The integrated circuit of claim 7, wherein:
  one or more of the first audio transformation or the second audio transformation includes modulating at least one of frequency, pitch, formant, amplitude, inflection, or grammar.
  11. The integrated circuit of claim 7, wherein the separating of the input audio into the first data and the second data comprises:
    determining whether an echo is present in the input audio based on a reference signal;
    removing an echo from the input audio based on the reference signal, in response to determining that an echo is present in the input audio;
    demixing the first data and the second data from the input audio; and
    increasing a gain of the first data.
  12. The integrated circuit of claim 11, wherein combining the anonymized first data and the second data comprises:
    decreasing the gain of the anonymized first data;
    mixing the anonymized first data and the second data to generate the anonymized audio data; and
    adding the reference signal to the anonymized audio data.
  13. A method, comprising:
    receiving an input audio and a reference signal;
    selecting one or more modules of a set of modules;
    in response to selecting a first module of the set of modules:
      generating, using the first module, voice data based on the input audio and the reference signal;

anonymizing, using the first module, the voice data by applying a first audio transformation; and
      transmitting, using the first module, the anonymized voice data to a first remote automatic speech recognition (ASR) module for generating speech recognition data; and
    in response to selecting a second module of the set of modules:
      separating, using the second module, the input audio into a first data and a second data;
      anonymizing, using the second module, the first data by applying a second audio transformation to the first data;
      generating an anonymized audio data by combining the anonymized first data and the second data; and
      transmitting the anonymized audio data to a second remote ASR module for generating speech recognition data.
  14. The method of claim 13, wherein the separating of the input audio into the first data and the second data comprises:
    removing, using the second module, the reference signal from the input audio;
    demixing, using the second module, the first data and the second data from the input audio; and
    increasing, using the second module, a gain of the first data.
  15. The method of claim 14, wherein combining the anonymized first data and the second data comprises:
    decreasing, using the second module, the gain of the anonymized first data;
    mixing, using the second module, the anonymized first data and the second data to generate the anonymized audio data; and
    adding, using the second module, the reference signal to the anonymized audio data.
  16. A system, comprising:
  a first module of a set of modules configured to perform operations comprising:
    separating an input audio into a first data and a second data;
    anonymizing the first data by applying a first audio transformation to the first data;
    generating an anonymized audio data by combining the anonymized first data and the second data; and
    transmitting the anonymized audio data to a first remote ASR module for generating speech recognition data; and
  a second module of a set of modules configured to perform operations comprising:
    generating voice data based on the input audio;
    anonymizing the voice data by applying a second audio transformation; and
    transmitting the anonymized voice data to a second remote automatic speech recognition (ASR) module for generating speech recognition data.
  17. The system of claim 16, wherein separating the input audio into the first data and the second data comprises:
    determining whether an echo is present in the input audio based on a reference signal;
    removing an echo from the input audio based on the reference signal, in response to determining that an echo is present in the input audio;
    demixing the first data and the second data from the input audio; and
    increasing a gain of the first data.

18. The system of claim 16, further comprising:
a third module of the set of modules configured to perform operations comprising:
    generating a second voice data based on the input audio; and
    providing the second voice data as input to a local ASR module for generating speech recognition data.

19. An integrated circuit, comprising:
a first module of a set of modules configured to perform operations comprising:
    separating an input audio into a first data and a second data;
    anonymizing the first data by applying a first audio transformation to the first data;
    generating an anonymized audio data by combining the anonymized first data and the second data; and
    transmitting the anonymized audio data to a first remote ASR module for generating speech recognition data; and
a second module of a set of modules configured to perform operations comprising:
    generating voice data based on the input audio;
    anonymizing the voice data by applying a second audio transformation; and
    transmitting the anonymized voice data to a second remote automatic speech recognition (ASR) module for generating speech recognition data.

20. The integrated circuit of claim 19, wherein separating the input audio into the first data and the second data comprises:
    determining whether an echo is present in the input audio based on a reference signal;
    removing an echo from the input audio based on the reference signal, in response to determining that an echo is present in the input audio;
    demixing the first data and the second data from the input audio; and
    increasing a gain of the first data.

21. The integrated circuit of claim 19, further comprising:
a third module of the set of modules configured to perform operations comprising:

generating a second voice data based on the input audio; and
    providing the second voice data as input to a local ASR module for generating speech recognition data.

22. A method, comprising:
receiving an input audio and a reference signal;
separating, using a first module, the input audio into a first data and a second data;
anonymizing, using the first module, the first data by applying a first audio transformation to the first data;
generating, using the first module, an anonymized audio data by combining the anonymized first data and the second data;
transmitting, using the first module, the anonymized audio data to a first remote ASR module for generating speech recognition data;
generating, using a second module, voice data based on the input audio and the reference signal;
anonymizing, using the second module, the voice data by applying a second audio transformation; and
transmitting, using the second module, the anonymized voice data to a second remote automatic speech recognition (ASR) module for generating speech recognition data.

23. The method of claim 22, wherein separating the input audio into the first data and the second data comprises:
    determining whether an echo is present in the input audio based on a reference signal;
    removing an echo from the input audio based on the reference signal, in response to determining that an echo is present in the input audio;
    demixing the first data and the second data from the input audio; and
    increasing a gain of the first data.

24. The method of claim 22, further comprising:
generating a second voice data based on the input audio; and
providing the second voice data as input to a local ASR module for generating speech recognition data.

* * * * *